United States Patent
Zhou (10) Patent No.: US 9,875,513 B2
(45) Date of Patent: *Jan. 23, 2018

(54) METHOD AND SYSTEM FOR VENTURE CAPITAL RAISING FOR STARTUP VIA AWARD AND REALITY TELEVISION SHOW

(71) Applicant: Dylan T X Zhou, Belvedere Tiburon, CA (US)

(72) Inventor: Dylan T X Zhou, Belvedere Tiburon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,200

(22) Filed: Apr. 18, 2016

(65) Prior Publication Data
US 2016/0232620 A1    Aug. 11, 2016

Related U.S. Application Data (63) Continuation-in-part of application No. 14/627,315, filed on Feb. 20, 2015, now Pat. No. 9,317,883, and a continuation-in-part of application No. 13/185,491, filed on Jul. 18, 2011, now Pat. No. 9,367,841, and a continuation-in-part of application No. 14/815,988, filed on Aug. 1, 2015, now Pat. No. 9,342,829, which is a continuation-in-part of application No.
(Continued)

(51) Int. Cl.
*G06F 17/30* (2006.01)
*G06Q 50/00* (2012.01)
*G06Q 30/02* (2012.01)
*G06Q 40/06* (2012.01)
*G06Q 30/00* (2012.01)
*G06Q 40/00* (2012.01)

(52) U.S. Cl.
CPC ....... *G06Q 50/01* (2013.01); *G06F 17/30864* (2013.01); *G06Q 30/00* (2013.01); *G06Q 30/0241* (2013.01); *G06Q 30/0279* (2013.01); *G06Q 40/00* (2013.01); *G06Q 40/06* (2013.01)

(58) Field of Classification Search
CPC ........... G06F 17/30386; G06F 17/3058; G06F 17/30864; G06Q 50/01
USPC ....... 707/748, 758; 709/217, 219; 725/9, 14, 725/93, 18; 705/329, 7.25, 7.23, 32
See application file for complete search history.

(56) References Cited

PUBLICATIONS

Samuel Korturn et al., Assessing the contribution of venture capital to innovation, RAND Journal of Economics, vol. 31, No. 4, Winter 2000, 674-692.*

* cited by examiner

*Primary Examiner* — Jean B Fleurantin
(74) *Attorney, Agent, or Firm* — Georgiy L. Khayet (57) ABSTRACT

Provided are equity crowdfunding platform for startup projects and methods of using thereof. An exemplary equity crowdfunding platform comprises an online service, a processor, and a database in communication with the online service and the processor. The online service is configured to receive information associated with a crowdfunding request from an owner of a startup project. The processor checks the information using a set of pre-defined rules to determine whether the startup project complies with the pre-defined rules. If the startup project related to the information complies with the pre-defined rules, the processor generates a crowdfunding request page for startup project using the information. The crowdfunding request page is provided to investors via the online service. The database is configured to store at least the information, the pre-defined rules, and the crowdfunding request page.

28 Claims, 5 Drawing Sheets

Related U.S. Application Data

14/034,509, filed on Sep. 23, 2013, now Pat. No. 9,510,277, which is a continuation-in-part of application No. 10/677,098, filed on Sep. 30, 2003, now Pat. No. 7,702,739.

(60) Provisional application No. 60/415,546, filed on Oct. 1, 2002.

METHOD AND SYSTEM FOR VENTURE CAPITAL RAISING FOR STARTUP VIA AWARD AND REALITY TELEVISION SHOW

CROSS-REFERENCE TO RELATED APPLICATIONS

This application is a continuation-in-part of U.S. patent application Ser. No. 14/627,315, entitled "METHOD AND SYSTEM FOR VENTURE CAPITAL RAISING FOR STARTUP VIA AWARD AND REALITY TV SHOW", filed on Feb. 20, 2015, U.S. patent application Ser. No. 13/185,491, entitled "FACILITATING MOBILE DEVICE PAYMENTS USING PRODUCT CODE SCANNING", filed on Jul. 18, 2011, U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which is a continuation-in-part of U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, which is a continuation of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to U.S. Provisional Patent Application No. 60/415,546, entitled "DATA PROCESSING SYSTEM", filed on Oct. 1, 2002, which are incorporated herein by reference in their entirety.

FIELD

This application relates generally to crowdfunding, and more specifically to methods and systems for equity crowdfunding of startup projects.

BACKGROUND

Equity crowdfunding enables broad groups of investors to fund startup companies and small businesses in return for equity. Crowdfunders provide money to a business and receive ownership of a part of the business. However, numerous startup projects and small businesses have limited access to equity crowdfunding as well as small investors have a limited range of businesses to which they can invest.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are an equity crowdfunding platform and methods of using thereof. Using the methods or platforms described herein an owner of a startup project may advertise his projects and raise funds online. For this purpose, the owner of the startup project may provide information about his projects to the equity crowdfunding platform. The equity crowdfunding platform may receiving, by an online service, information associated with a crowdfunding request from an owner of a startup project. The equity crowdfunding platform may check the information using a set of pre-defined rules to determine whether the startup project complies with the pre-defined rules. For the complying startup project based on the checking, the equity crowdfunding platform may generate a crowdfunding request page using the information. The crowdfunding request page may be provided to investors via the online service. At least one of the investors may send an investment transfer request associated with the crowdfunding request page. On receiving the investment transfer request, the equity crowdfunding platform may transmit it to a financial facility. After receiving a notification about successful execution of the investment transfer request, one or more securities associated with the startup project may be provided to the investor.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

An equity crowdfunding platform for startup projects and methods of using thereof are described herein. The described equity crowdfunding platform allows general public to review and invest in startup projects directly via an online service. The equity crowdfunding platform may provide for facilitated distribution of information about startup projects that raise finance and investment transferring using online services. Small businesses and startup projects obtain easy access to fund raising capabilities. On the other side, potential investors may review, compare, and select projects for investment.

Figure 1:
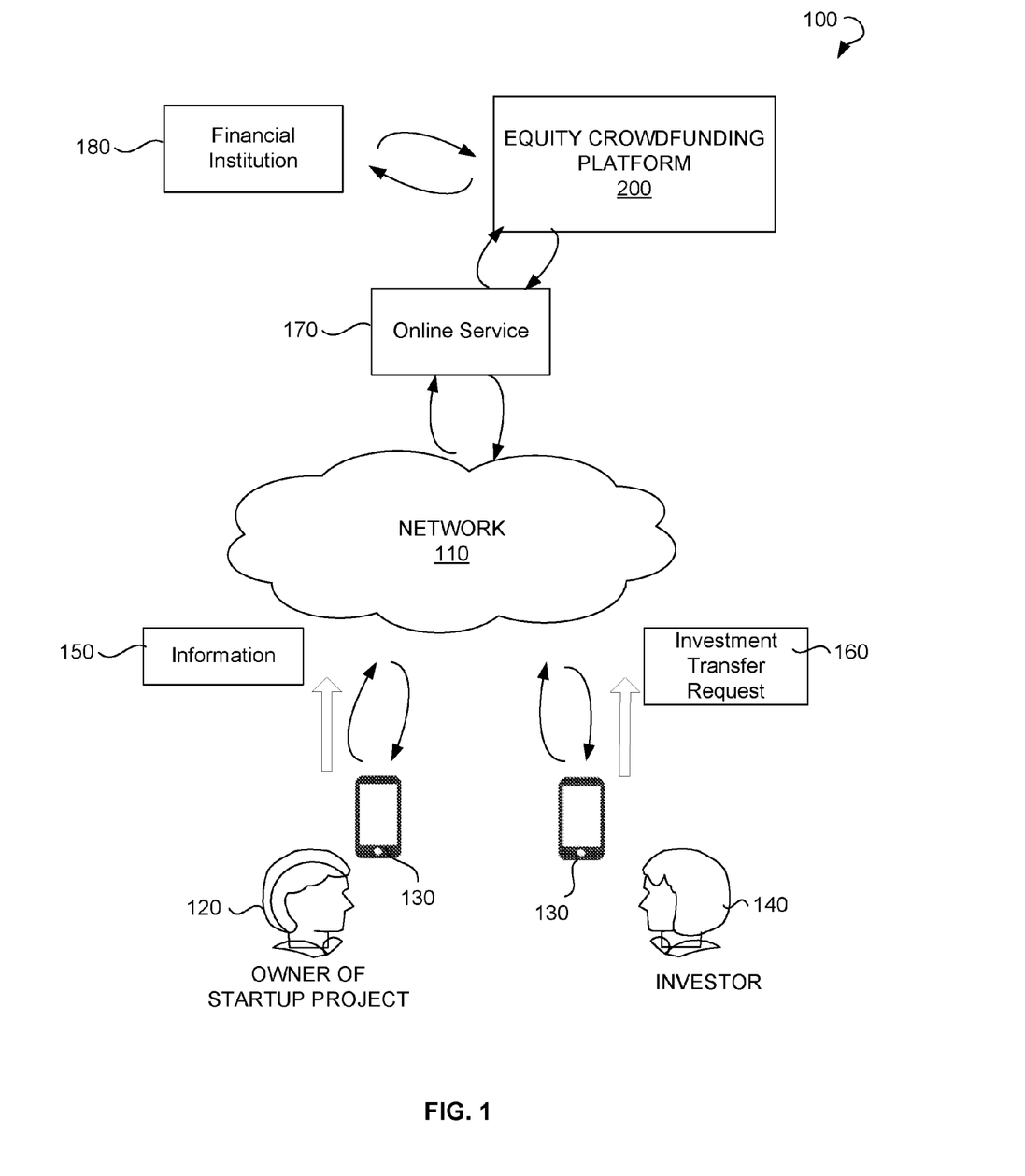
FIG. 1 is a block diagram showing an environment within which an equity crowdfunding platform for startup projects and a method of using thereof can be implemented, in accordance with an example embodiment.

Referring now to the drawings, FIG. 1 illustrates an environment 100 within which an equity crowdfunding platform 200 and a method of using thereof can be implemented. The environment 100 may include an owner of a startup project 120, a client device 130, network 110, and the equity crowdfunding platform 200. The equity crowdfunding platform 200 may include an online service 170. The owner of a startup project 120 (or another person associated with the startup project) may provide information 150 about the startup project via the online service 170. The information 150 may include a description of the startup project, an industry to which the startup project relates, a minimum investment amount, a total target investment amount, a business plan, financial details of the owner of startup project 120 (e.g., account number, credit card for investment transfers), and so forth.

The client device 130 may include a smart phone, a tablet PC, a lap top, a personal computer, and so forth. The information 150 may be provided through the client device 130 to the online service 170 via the network 110.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

The information 150 may be transmitted by the online service 170 to other component of the equity crowdfunding platform 200 for checking and processing. Among others processes, the information 150 may be checked for compliance of the associated startup project with pre-defined rules determining which startup projects may participate in equity crowdfunding. The pre-defined rules may include financial requirements, industry limitations, a minimum investment amount, a maximum total target investment amount, and so forth. If the startup project complies with the requirements set by the pre-defined rules, the equity crowdfunding platform 200 may generate a crowdfunding request page that is provided for investor 140 via the online service 170. The investor 140 may review crowdfunding request pages for various startup projects, filter crowdfunding request pages by key words, a target industry, a minimum investment amount, and so forth. When the investor 140 selects the startup project for investment, the investor sends an investment transfer request 160 associated with the startup project via the online service 170. The investment transfer request 160 may include an investment amount, financial information of the investor 140 (for example, account details, credit card number), and so forth.

The equity crowdfunding platform 200 may transmit the investment transfer request 160 to a financial institution 180 (e.g., a bank) for processing. The financial institution 180 may process the investment transfer request 160 and send a notification about processing status to the equity crowdfunding platform 200. For example, the financial institution 180 may send a notification that the investment transfer request is executed successfully. After successful investment transfer, a corresponding number of securities of the startup project may be provided to the investor.

Figure 2:
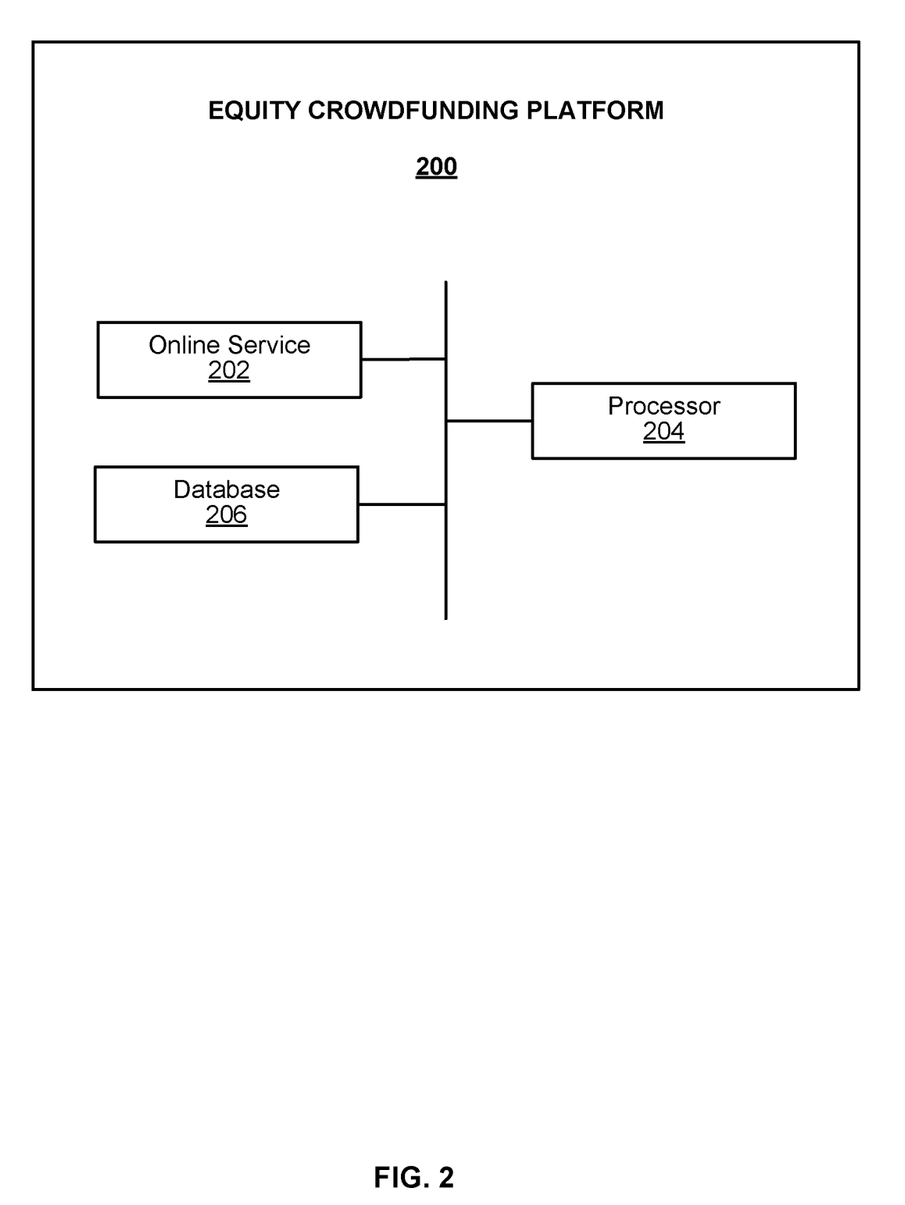
FIG. 2 is a block diagram showing various modules of the equity crowdfunding platform for startup projects, in accordance with certain embodiments.

FIG. 2 is a block diagram showing various modules of the equity crowdfunding platform 200, in accordance with certain embodiments. The equity crowdfunding platform 200 may comprise an online service 202, a processor 204, and a database 204. The online service 202 may include a web portal, mobile application, or a cloud service. The online service may communicate with the processor 204. The processor 204 may include a programmable processor, such as a microcontroller, central processing unit (CPU), and so forth. In other embodiments, the processor 204 may include an application-specific integrated circuit (ASIC) or programmable logic array (PLA), such as a field programmable gate array (FPGA), designed to implement the functions performed by the equity crowdfunding platform 200.

The online service 202 may receive information associated with a crowdfunding request from an owner of a startup project and transmit the information to the processor 204. The processor 202 may check the information using a set of pre-defined rules to determine whether the startup project complies with the pre-defined rules. For the complying startup projects the processor 204 may generate a crowdfunding request page using the information. The online service 202 may provide the generated crowdfunding request page to investors. The investors may review crowdfunding request pages when they visit the online service 202. Alternatively, the online service 202 may send notifications to the investors when a new crowdfunding request page is generated. Additionally, the investor may set preferences for notifications. For example, the investor may select to be notified about new startup projects in IT industry, located in a specific area (e.g., California), projects from a specific owners, and so forth. Then, the online service 202 may notify the investor only about new projects that correspond to his preferences.

The database 206 may be configured to store the information about the startup projects, the pre-defined rules, the crowdfunding request page, and so forth.

Figure 3:
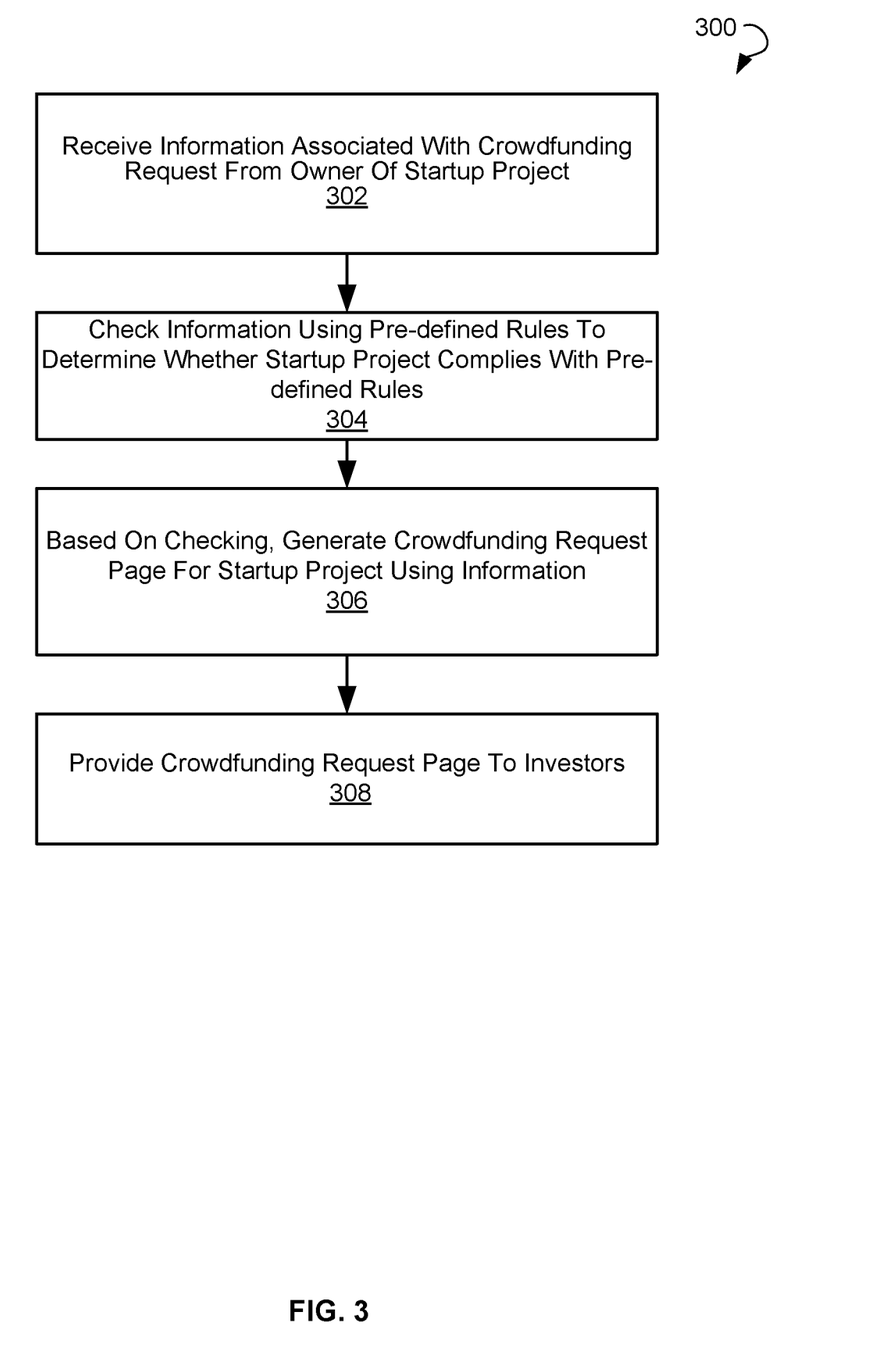
FIG. 3 is a flow chart illustrating a method for equity crowdfunding for startup projects, in accordance with certain embodiments.

FIG. 3 is a flow chart illustrating a method 300 for equity crowdfunding for startup projects, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the equity crowdfunding platform 200, and the various elements of the equity crowdfunding platform 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 302 with receiving information associated with a startup project from an owner of a startup project. The information may be received by the online service. For example, the owner may fill in the form to describe the startup project. The information may include project description, audio and/or video records, financial reports, business plans, drawings, images, financial details, expert opinions, links to other projects of the owner, and so forth.

At operation 304, the processor may check the information to determine whether the startup project complies with the pre-defined rules. The pre-defined rules may be predetermined by an administrator associated with the online service and may restrict startup projects eligible for fund raising via the equity crowdfunding platform. The pre-defined rules may include financial requirements (e.g., maximum investment amount), industry limitations (e.g., IT industry only), a minimum investment amount (e.g., a price of one security), and the like.

If the startup project, for which information is provided, is eligible for fund raising based on the checking, the processor may generate a crowdfunding request page for the startup project at operation 306. The crowdfunding request page may include an offering on at least one security associated with the startup project in return for an amount of investment.

At operation 308, the crowdfunding request page may be provided to investors via the online service. The investors may have access to the online service on a subscription basis. For example, the investor may register with the online service and pay a monthly fee to be able to view the crowdfunding request pages on the online service.

Additionally, to facilitate selection of a startup project for investment, the online service may allow filtering crowdfunding request pages by a key word, a target industry, a minimum investment amount, and so forth. The online service may receive a filtering command from the investor and filter the displayed crowdfunding request pages for startup projects based on the filtering commands.

When the investor finds the startup project to which he desires to invest, he send an investment transfer request via the online service. The investment transfer request may include an investment amount, a number of securities purchased by the investment amount, the startup project, financial information of the investor, and so forth. When processor receives the investment transfer request associated with the crowdfunding request page from the investor, the processor transmits the investment transfer request to a financial facility, such as bank. The financial facility processes the investment transfer request and notifies the equity crowdfunding platform about the results of the processing. When the equity crowdfunding platform receives a notification that the money transfer request is executed successfully, the securities associated with the investment transfer request may be provided to the investor. Additionally, the crowdfunding request page may be modified to show one or more investments raised by the startup project and the securities available for investment.

In some embodiments, the equity crowdfunding platform may store records associated with the startup project. The records may include data from open sources and data provided by the owner of the startup project. Additionally, the records may include data periodically provided by the owner and/or investors or potential investors during the lifecycle of the startup project (e.g., progress reports, investor comments, updates, financial reports, and so forth). Based on the records, the equity crowdfunding platform may generate analytics for the startup project. The analytics may include statistical data, progress reports, ratings, and so forth. The analytics may be available for investors only.

Figure 4:
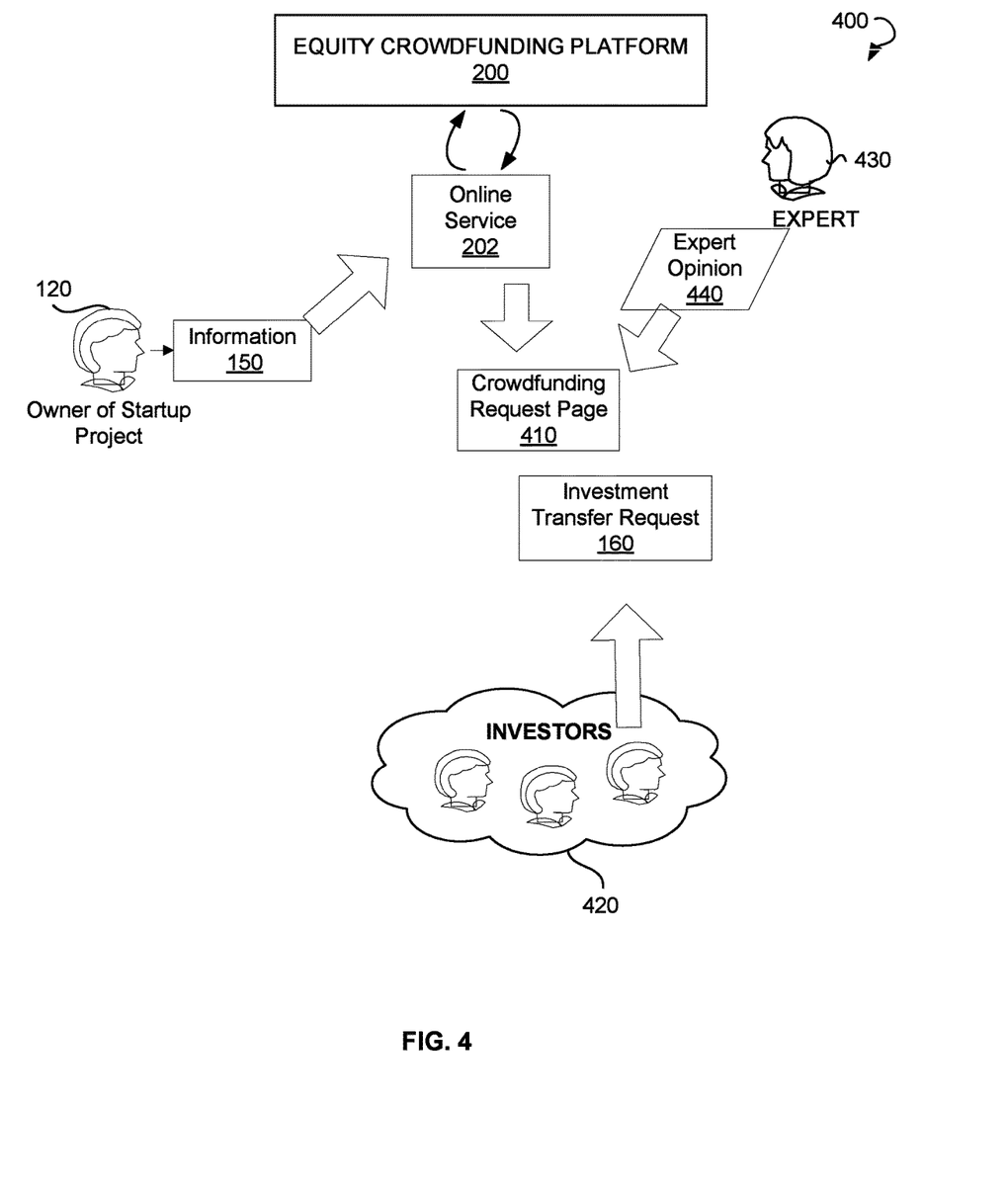
FIG. 4 is a block diagram illustrating raising funds via the equity crowdfunding platform, in accordance with certain embodiments.

FIG. 4 is a block diagram 400 illustrating raising funds 400 via the equity crowdfunding platform, in accordance with certain embodiments. The owner of startup project may send information 150 about the startup project to the equity crowdfunding platform via the online service 202. Based on the information, a crowdfunding request page 410 may be generated and provided to investors 420. Additionally, an expert 430 may review the crowdfunding request page 410 and provide an expert opinion 440 about the startup project associated with the crowdfunding request page 410. The expert opinion may be placed on the crowdfunding request page 410 to facilitate decision making for the investors 420. Furthermore, at least one of the investors may send an investment transfer request 160 related to the crowdfunding request page 410 to participate in the startup project.

In an example embodiment, the online service may be associated with an equity crowdfunding stock exchange. The equity crowdfunding stock exchange may include one or more of the following: an electronic stock market, an automated trading system, a quotation system, an online trading system, an alternative trading system, an electronic communication network, a trade, and so forth. In some example embodiments, the equity crowdfunding stock exchange may be configured to provide services for one or more of the following: buying securities, selling the securities, issuing the securities, redeeming the securities, paying an income, paying dividends, and so forth. In an example embodiment, the securities may include one or more of the following: stocks issued by crowdfunding companies, unit trusts, derivatives, pooled investment products, bonds, and so forth. In a further example embodiment, the securities may be listed in the equity crowdfunding stock exchange. The equity crowdfunding stock exchange may include an equity crowdfunding stock exchange over-the-counter. The equity crowdfunding stock exchange over-the-counter may be associated with trading between two parties. Moreover, the equity crowdfunding stock exchange over-the-counter may be associated with commodities, financial instruments, derivatives, and so forth.

In further example embodiments, the equity crowdfunding platform may be associated with raising monetary contributions performed via internet-mediated registries, mail-order subscriptions, benefit events, and so forth. The equity crowdfunding platform may serve as a moderating organization between a project initiator proposing a crowdfunding project to be funded and one or more individuals supporting the crowdfunding project.

In an example embodiment, the online service may be associated with one or more of the following: rewards crowdfunding, equity crowdfunding, debt-based crowdfunding, and crowdsourcing, each of which may be associated with a reality show, a reality television show, or an online live video show. More specifically, the rewards crowdfunding may be associated with pre-selling a product or a service to launch a crowdfunding project using one or more of the following: motion picture promotion, free software development, invention development, scientific research, reality television shows, civic projects, and so forth. The equity crowdfunding may be associated with providing finances in a form of equity by a plurality of individuals. The equity crowdfunding may further be associated with offering the securities associated with a private company to a group of people for investment, funding startup companies and small businesses in return for equity by providing money to a project and receiving an ownership of a piece of the object. The debt-based crowdfunding may be associated with peer-to-peer crowdfunding, marketplace lending, and crowdlending integrated into each other. The debt-based crowdfunding may further be associated with buying the securities by a project inventor to make loans to a borrower. The project inventor may receive money from an interest on unsecured loans. In further example embodiments, the crowdsourcing may be associated with soliciting contributions from an online community. Each of a plurality of contributors may add a contribution that may be combined with contributions of the plurality of contributors.

Figure 5:
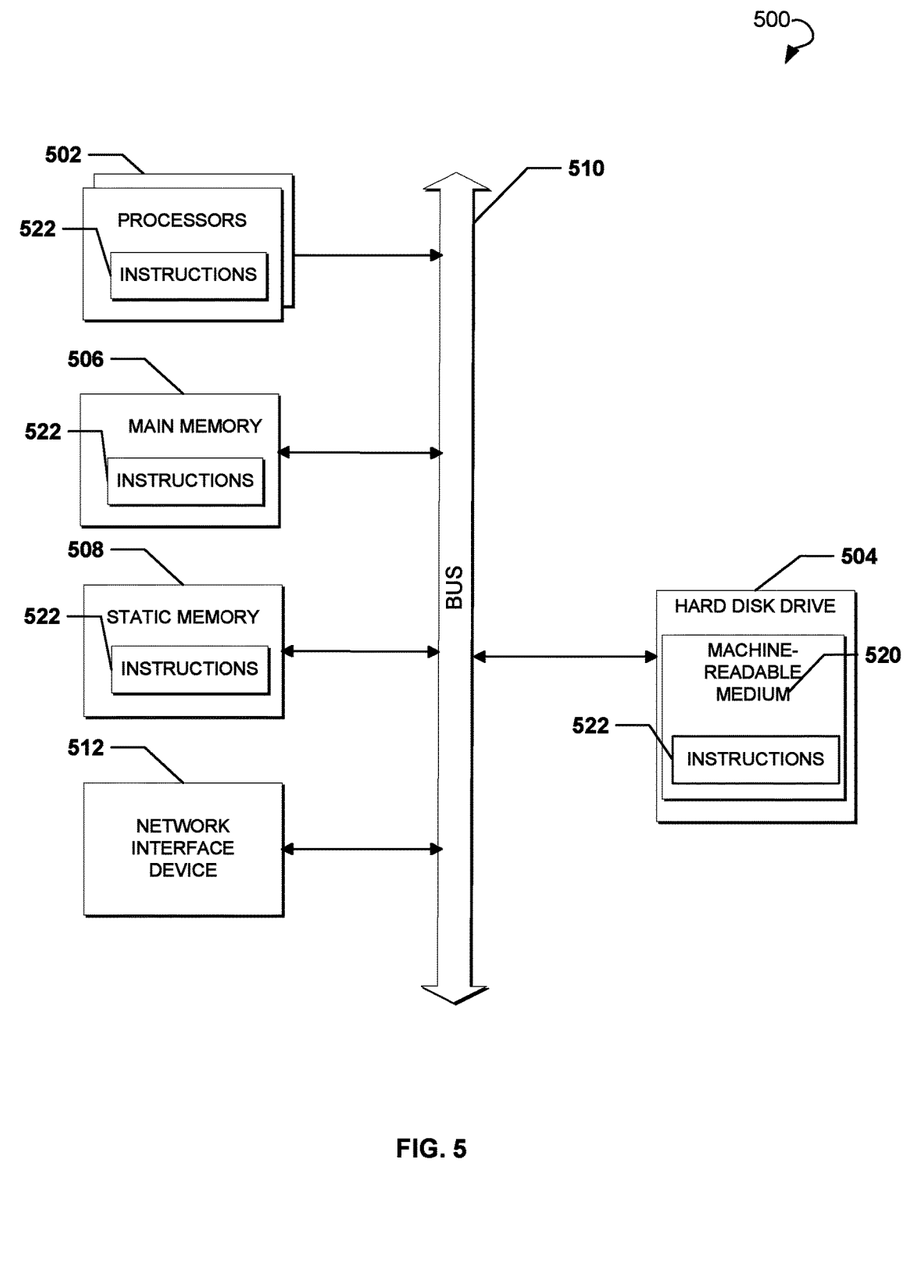
FIG. 5 shows a diagrammatic representation of a computing device for a machine in the exemplary electronic form of a computer system, within which a set of instructions for causing the machine to perform any one or more of the methodologies discussed herein, can be executed.

FIG. 5 shows a diagrammatic representation of a computing device for a machine in the exemplary electronic form of a computer system 500, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502, a hard disk drive 504, a main memory 506 and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506 and/or within the processors 502 during execution thereof by the computer system 500. The main memory 506 and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various equity crowdfunding platforms and methods of using thereof have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for equity crowdfunding for startup projects, the method comprising:
receiving, by an online service, information associated with a startup project from an owner of the startup project, the information being received based on uploading of the information by the owner to a web portal associated with the online service;
checking, by a processor, the information using a set of predefined rules to determine whether the startup project complies with the set of predefined rules, wherein the set of predefined rules defines criteria for the startup projects to be accepted by the online service for equity crowdfunding;
based on the determining that the startup project complies with the set of predefined rules, generating, by the processor, on the web portal, a crowdfunding request page associated with the startup project using the information;
providing, via the online service, the crowdfunding request page to investors, wherein the providing includes sending, to the investors, a notification that the crowdfunding request page associated with the startup project is generated on the web portal;
keeping records, by the processor, associated with the startup project, wherein the records include data from open sources and data provided by the owner of the startup project;

based on the records, generating analytics for the startup project, wherein the analytics includes one or more of the following: statistical data, one or more progress reports, and one or more ratings; and
providing the analytics for the startup project on the crowdfunding request page.

2. The method of claim 1, wherein the crowdfunding request page includes an offering on at least one security associated with the startup project in return for an amount of investment.

3. The method of claim 1, wherein the set of predefined rules include financial requirements, industry limitations, and a minimum investment amount.

4. The method of claim 1, wherein the crowdfunding request page is generated for the startup project that complies with the set of predefined rules.

5. The method of claim 1, wherein access to the online service is provided on a subscription basis.

6. The method of claim 1, further comprising:
receiving, by the online service, a filtering command from an investor, wherein the filtering command includes one or more of the following: a key word, a target industry, and a minimum investment amount; and
based on the filtering command, providing a list of filtered crowdfunding request page.

7. The method of claim 1, further comprising:
receiving, by the online service, an investment transfer request associated with the crowdfunding request page from at least one of the investors; and
based on the investment transfer request, transmitting an investment transfer request to a financial facility.

8. The method of claim 7, wherein the investment transfer request includes an investment amount.

9. The method of claim 7, further comprising:
receiving, by the processor, a notification that the investment transfer request is executed successfully; and
based on the notification, modifying the crowdfunding request page to show one or more investments raised by the startup project.

10. The method of claim 7, further comprising:
based on the investment transfer request, providing at least one security to the at least one of the investors.

11. The method of claim 1, further comprising:
receiving, by the online service, at least one expert opinion associated with the startup project; and
providing the at least one expert opinion on the crowdfunding request page associated with the startup project.

12. A system for equity crowdfunding for startup projects, the system comprising:
an online service configured to:
receive information associated with a startup project from an owner of the startup project, the information being received based on uploading of the information by the owner to a web portal associated with the online service; and
provide a crowdfunding request page to investors, wherein the providing includes sending, to the investors, a notification that the crowdfunding request page associated with the startup project is generated on the web portal;
a processor in communication with the online service and configured to:
check the information using a set of predefined rules to determine whether the startup project complies with the set of predefined rules, wherein the set of predefined rules defines criteria for the startup projects to be accepted by the online service for equity crowdfunding;
based on the determining that the startup project complies with the set of predefined rules, generate, on the web portal, the crowdfunding request page associated with the startup project using the information;
keep records associated with the startup project, wherein the records include data from open sources and data provided by the owner of the startup project;
based on the records, generate analytics for the startup project, wherein the analytics includes one or more of the following: statistical data, one or more progress reports, and one or more ratings; and
provide the analytics for the startup project on the crowdfunding request page; and
a database in communication with the online service and the processor, the database being configured to store at least the information, the set of predefined rules, and the crowdfunding request page.

13. The system of claim 12, wherein the crowdfunding request page includes an offering on at least one security associated with the startup project in return for an amount of investment.

14. The system of claim 12, wherein the set of predefined rules include financial requirements, industry limitations, and a minimum investment amount.

15. The system of claim 12, wherein the crowdfunding request page is generated for the startup project that complies with the set of predefined rules.

16. The system of claim 12, wherein access to the online service is provided on a subscription basis.

17. The system of claim 12, wherein the online service provides a filtering capability based on one or more of the following: a key word, a target industry, and a minimum investment amount.

18. The system of claim 12, wherein the online service is further configured to receive an investment transfer request associated with the crowdfunding request page from at least one of the investors, wherein the investment transfer request is transmitted to a financial facility.

19. The system of claim 18, wherein the investment transfer request includes an investment amount.

20. The system of claim 18, wherein a notification of successful execution of the investment transfer request is received.

21. The system of claim 18, wherein at least one security is provided to the at least one of the investors based on the investment transfer request.

22. The system of claim 12, wherein the online service is further configured to:
receive at least one expert opinion associated with the startup project; and
provide the at least one expert opinion on the crowdfunding request page associated with the startup project.

23. A system for equity crowdfunding for startup projects, the system comprising:
an online service configured to:
receive information associated with a startup project from an owner of the startup project, the information being received based on uploading of the information by the owner to a web portal associated with the online service; and
provide a crowdfunding request page to investors, wherein the providing includes sending, to the investors, a notification that the crowdfunding request page associated with the startup project is generated on the web portal;

receive an investment transfer request associated with the crowdfunding request page from at least one of the investors, wherein the investment transfer request is transmitted to a financial facility, and wherein at least one security is provided to the at least one of the investors based on the investment transfer request;

a processor in communication with the online service and configured to:

check the information using a set of predefined rules to determine whether the startup project complies with the set of predefined rules, wherein the set of predefined rules defines criteria for the startup projects to be accepted by the online service for equity crowdfunding;

based on the determining that the startup project complies with the set of predefined rules, generate, on the web portal, the crowdfunding request page associated with the startup project using the information;

keep records associated with the startup project, wherein the records include data from open sources and data provided by the owner of the startup project;

based on the records, generate analytics for the startup project, wherein the analytics includes one or more of the following: statistical data, one or more progress reports, and one or more ratings; and provide the analytics for the startup project on the crowdfunding request page; and a database in communication with the online service and the processor, the database configured to store at least the information, the predefined rules, and the crowdfunding request page.

24. The system of claim 23, wherein the crowdfunding request includes an offering on at least one security associated with the startup project in return for an amount of investment.

25. The system of claim 23, wherein the investment transfer request includes an investment amount.

26. The system of claim 25, wherein a number of securities provided to the at least one of the investors is calculated based on the investment amount, wherein the online service is associated with an equity crowdfunding stock exchange, wherein the equity crowdfunding stock exchange includes one or more of the following: an electronic stock market, an automated trading system, a quotation system, an online trading system, an alternative trading system, an electronic communication network or a trade, wherein the online service is associated with one or more of the following: a reality show, a reality television show, and an online live video show, wherein the equity crowdfunding stock exchange is configured to provide services for one or more of the following: buying securities, selling the securities, issuing the securities, redeeming the securities, paying an income, and paying dividends, wherein the securities include one or more of the following: stocks issued by crowdfunding companies, unit trusts, derivatives, pooled investment products, and bonds, wherein the securities are listed in the equity crowdfunding stock exchange, wherein the equity crowdfunding stock exchange includes an equity crowdfunding stock exchange over-the-counter, wherein the equity crowdfunding stock exchange over-the-counter is associated with trading between two parties, wherein the equity crowdfunding stock exchange over-the-counter is associated with commodities, financial instruments, and derivatives, wherein the equity crowdfunding platform is associated with raising monetary contributions performed via internet-mediated registries, mail-order subscriptions, and benefit events, wherein the equity crowdfunding platform serves as a moderating organization between a project initiator proposing a crowdfunding project to be funded and one or more individuals supporting the crowdfunding project.

27. The system of claim 23, wherein the investors register with the online service and pay a subscription fee for access to the online service.

28. The system of claim 23, wherein the online service is associated with one or more of the following: rewards crowdfunding, equity crowdfunding, debt-based crowdfunding, and crowdsourcing, wherein each of the rewards crowdfunding, the equity crowdfunding, the debt-based crowdfunding, and the crowdsourcing is associated with one or more of the following: a reality show, a reality television show, and an online live video show, wherein the rewards crowdfunding is associated with pre-selling a product or a service to launch a crowdfunding project using one or more of the following: motion picture promotion, free software development, invention development, scientific research, and civic projects, wherein the equity crowdfunding is associated with providing finances in a form of equity by a plurality of individuals, wherein the equity crowdfunding is further associated with offering the securities associated with a private company to a group of people for investment, funding startup companies and small businesses in return for equity by providing money to a project and receiving an ownership of a piece of the object, wherein the debt-based crowdfunding is associated with peer-to-peer crowdfunding, marketplace lending, and crowdlending integrated into each other, wherein the debt-based crowdfunding is further associated with buying the securities by a project inventor to make loans to a borrower, wherein the project inventor receives money from an interest on unsecured loans, wherein the crowdsourcing is associated with soliciting contributions from an online community, wherein each of a plurality of contributors adds a contribution being combined with contributions of the plurality of contributors.

* * * * *